United States Patent
Otani (10) Patent No.: US 9,012,797 B2
(45) Date of Patent: Apr. 21, 2015

(54) VEHICULAR LEVER SWITCH AND METHOD OF ASSEMBLING SAME

(71) Applicant: Niles Co., Ltd., Tokyo (JP)

(72) Inventor: Toshiya Otani, Tokyo (JP)

(73) Assignee: Valeo Japan Co., Ltd., Tokyo (JP)

( * ) Notice: Subject to any disclaimer, the term of this patent is extended or adjusted under 35 U.S.C. 154(b) by 243 days.

(21) Appl. No.: 13/668,998

(22) Filed: Nov. 5, 2012

(65) Prior Publication Data

US 2013/0118880 A1 May 16, 2013

(30) Foreign Application Priority Data

Nov. 15, 2011 (JP) .................................. 2011-249405

(51) Int. Cl.
*H01H 13/14* (2006.01)
*B60Q 1/14* (2006.01)

(52) U.S. Cl.
CPC ......... *B60Q 1/1476* (2013.01); *Y10T 29/49105* (2015.01)

(58) Field of Classification Search
CPC ..... H01H 36/0006; H01H 9/04; H01H 13/02; H01H 13/023; H01H 13/06; H01H 13/183; H01H 13/52; H01H 19/18; H01H 19/58; H01H 19/585; H01H 1/58; H01H 3/16; H01H 3/161; H01H 3/166; H01H 9/0271; H01H 9/287; H01H 2239/038; H01H 2300/032; H01H 25/00; H01H 27/00; H01H 27/06; H01H 35/06; H01H 36/00; H01H 36/02; B60Q 1/1476; B60Q 1/445; B60Q 2900/10; B60Q 1/326; B60Q 2900/30; B60Q 1/1461; B60Q 1/1469; B60Q 1/2611; B60Q 1/2615; B60Q 7/00

USPC ...................... 200/520, 61.27, 1 R, 5 R, 52 R
See application file for complete search history.

(56) References Cited

U.S. PATENT DOCUMENTS

| | | | | |
|---|---|---|---|---|
| 5,003,132 A * | 3/1991 | Lagier | .............................. | 200/4 |
| 5,430,265 A * | 7/1995 | Beattie et al. | .............. | 200/61.54 |
| 5,859,396 A * | 1/1999 | Yokoyama | ................. | 200/61.54 |
| 5,905,237 A * | 5/1999 | Hayakawa et al. | ........ | 200/61.28 |
| 5,939,686 A * | 8/1999 | Bellach et al. | ............. | 200/61.54 |
| 6,260,431 B1 * | 7/2001 | Yokoyama | ...................... | 74/469 |
| 6,670,564 B2 * | 12/2003 | Naito et al. | ................. | 200/61.54 |
| 6,849,818 B2 * | 2/2005 | Koide et al. | .................... | 200/564 |
| 6,878,886 B1 * | 4/2005 | Mange et al. | ................. | 200/5 R |
| 7,238,899 B2 * | 7/2007 | Sugino | ........................ | 200/61.54 |
| 7,482,545 B2 * | 1/2009 | Kikuchi | ...................... | 200/61.54 |
| 7,485,819 B2 * | 2/2009 | Reischl et al. | ............. | 200/61.54 |
| 2008/0185278 A1* | 8/2008 | Kikuchi | ........................ | 200/341 |

FOREIGN PATENT DOCUMENTS

JP 10-269898 10/1998

* cited by examiner

*Primary Examiner* — Kyung Lee
(74) *Attorney, Agent, or Firm* — Rader, Fishman & Grauer PLLC (57) ABSTRACT

There is provided a vehicular lever switch including an operational lever, a tubular case forming part of the operational lever, and a switch device provided in the tubular case to be operable in an axis Y direction. In addition, the switch device comprises an operational knob provided to be inserted into an opening formed in an operational component in the case, a push switch operated by the operational knob, and a knob holder provided in the case to support the operational knob to be movable forward and backward in the axis Y direction as an operational direction of the push switch. In this structure, the knob holder is fixed and supported to a side of the case.

6 Claims, 11 Drawing Sheets

VEHICULAR LEVER SWITCH AND METHOD OF ASSEMBLING SAME

CROSS-REFERENCE TO RELATED APPLICATION

This application claims priority under 35 USC 119 from Japanese Patent Application No. 249405/2011 filed on Sep. 15, 2011, the disclosure of which is incorporated by reference herein.

BACKGROUND OF THE INVENTION

1. Field of the Invention

The present invention relates to a vehicular lever switch and a method of assembling the vehicular lever switch.

2. Description of the Related Art

As to a vehicular lever switch, operational switches for in-vehicle equipment, such as vehicular lights and wipers are provided in an operational lever thereof. For example, in a vehicular lever switch disclosed in Japanese Patent Laid-Open Publication No. 10-269898, a first push switch, a rotary switch, and a second push switch are provided in that order from a front end side of an operational lever.

Figure 11:
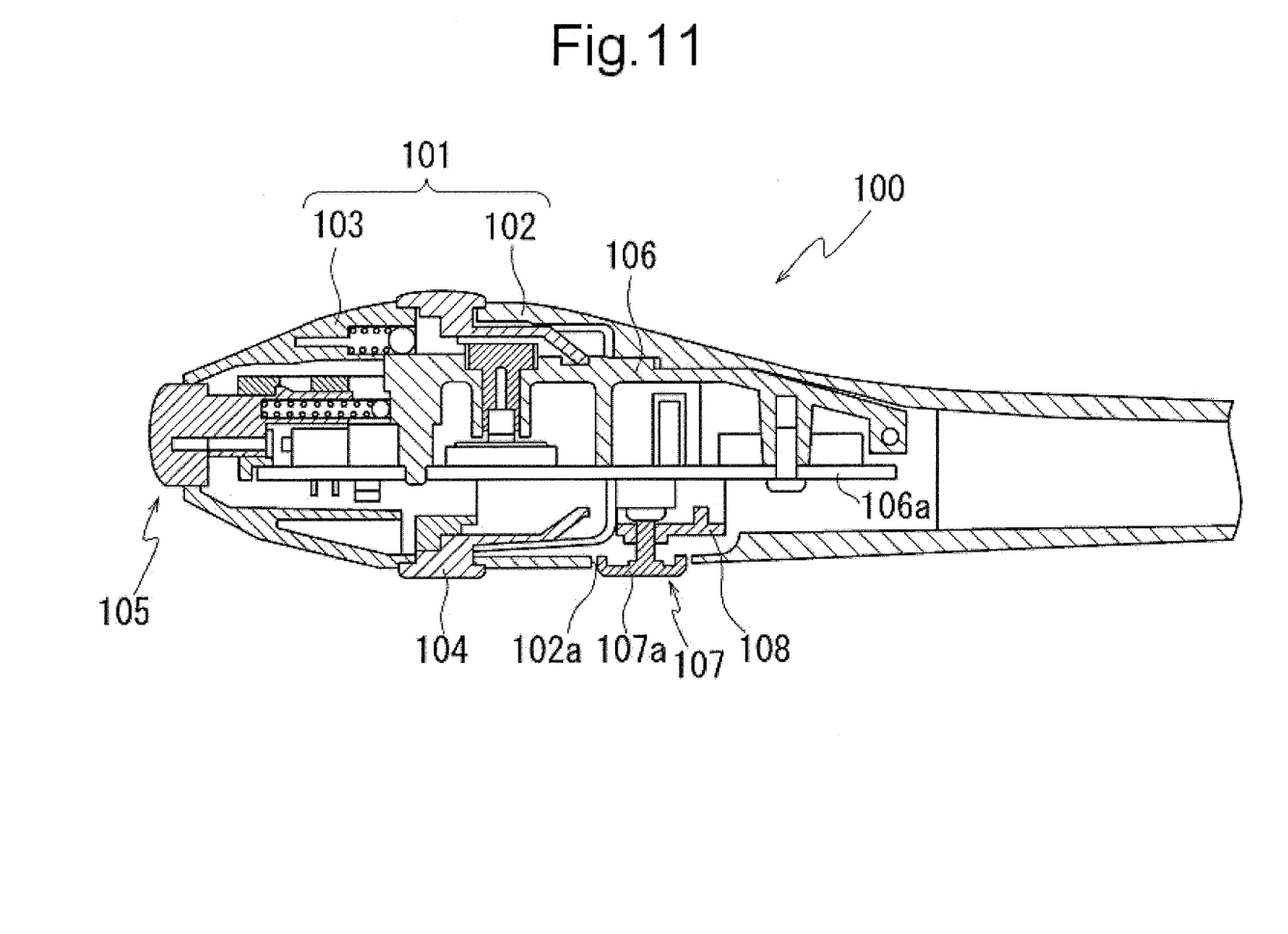
FIG. 11 is a cross section showing a vehicular lever switch according to the conventional example.

FIG. 11 is a cross section of the vehicular lever switch disclosed in Japanese Patent Laid-Open Publication No. 10-269898. The vehicular lever switch 100 disclosed in Japanese Patent Laid-Open Publication No. 10-269898 is provided with a ring-shaped rotary switch 104 to be rotatable between an annular stoke component 102 and a case component 103 forming part of a case 101. A holder 106 a base end of which is fitted into and fixed to the stoke component 102 is positioned inside the case 101 and the rotary switch 104. The holder 106 is provided with a first push switch 105 mounted at the front end.

A second push switch 107 is supported through a knob holder 108 to the holder 106, and an operational component 107a of the second push switch 107 is structured to be movable forward and backward in a direction perpendicular to the holder 106 (base board 106a).

Here, the vehicular lever switch 100 is assembled according to the following procedure. (1) Components of the rotary switch 104 and the first push switch 105, and the knob holder 108 of the second push switch 107 are assembled to the holder 106. (2) Next, the holder 106 is fitted into the stoke component 102. (3) Then, the operational component 107a is inserted through an opening 102a of the stoke component 102 to be connected to the knob holder 108. The second push switch 107 is completed according to the above procedure of (1) to (3).

Therefore at the time of inserting the holder 106 into the stoke component 102 for installation, for assembling the operational component 107a followed by it, it is necessary for the knob holder 108 to be arranged inside the opening 102a of the stoke component 102 with excellent positional accuracy. However, the second push switch 107 is structured to be supported through the knob holder 108 to the stoke component 102, and indirectly supported by the stoke component 102. Therefore there possibly occurs a positional deviation between the opening 102a and the knob holder 108 caused by a dimensional tolerance or the like.

In this case, there is a possibility that the operational component 107a having been inserted into the opening 102a can not be assembled to the knob holder 108 and the second push switch 107 can not be completed. Therefore according to the conventional vehicular lever switch, for preventing the operational component 107a from being not assembled to the knob holder 108, it is required to widen a size of the opening 102a in advance assuming the dimensional tolerance or the like.

Therefore it is required to reduce the positional deviation between the opening and the knob holder.

SUMMARY OF THE INVENTION

Accordingly, the present invention is made in view of the above-described problems, and an object of the present invention is to provide a vehicular lever switch which can reduce a positional deviation between an opening and a knob holder.

According to an aspect of the present invention, there is provided a vehicular lever switch including an operational lever, a tubular case forming part of the operational lever, and a switch device provided in the tubular case to be operable in a direction perpendicular to an axial direction of the operational lever, the switch device comprising:

an operational knob provided to be inserted through an opening formed in the tubular case;

a push switch operated by the operational knob; and a knob holder provided in the tubular case to support the operational knob to be movable forward and backward in an operational direction of the push switch, wherein the knob holder is directly fixed and supported to the tubular case.

According to the aspect of the present invention, since the knob holder is directly fixed and supported to the tubular case, the positional deviation between the opening and the knob holder can be made smaller as compared to a case where the knob holder is indirectly supported to the tubular case.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DESCRIPTION OF THE PREFERRED EMBODIMENT

Figure 1:
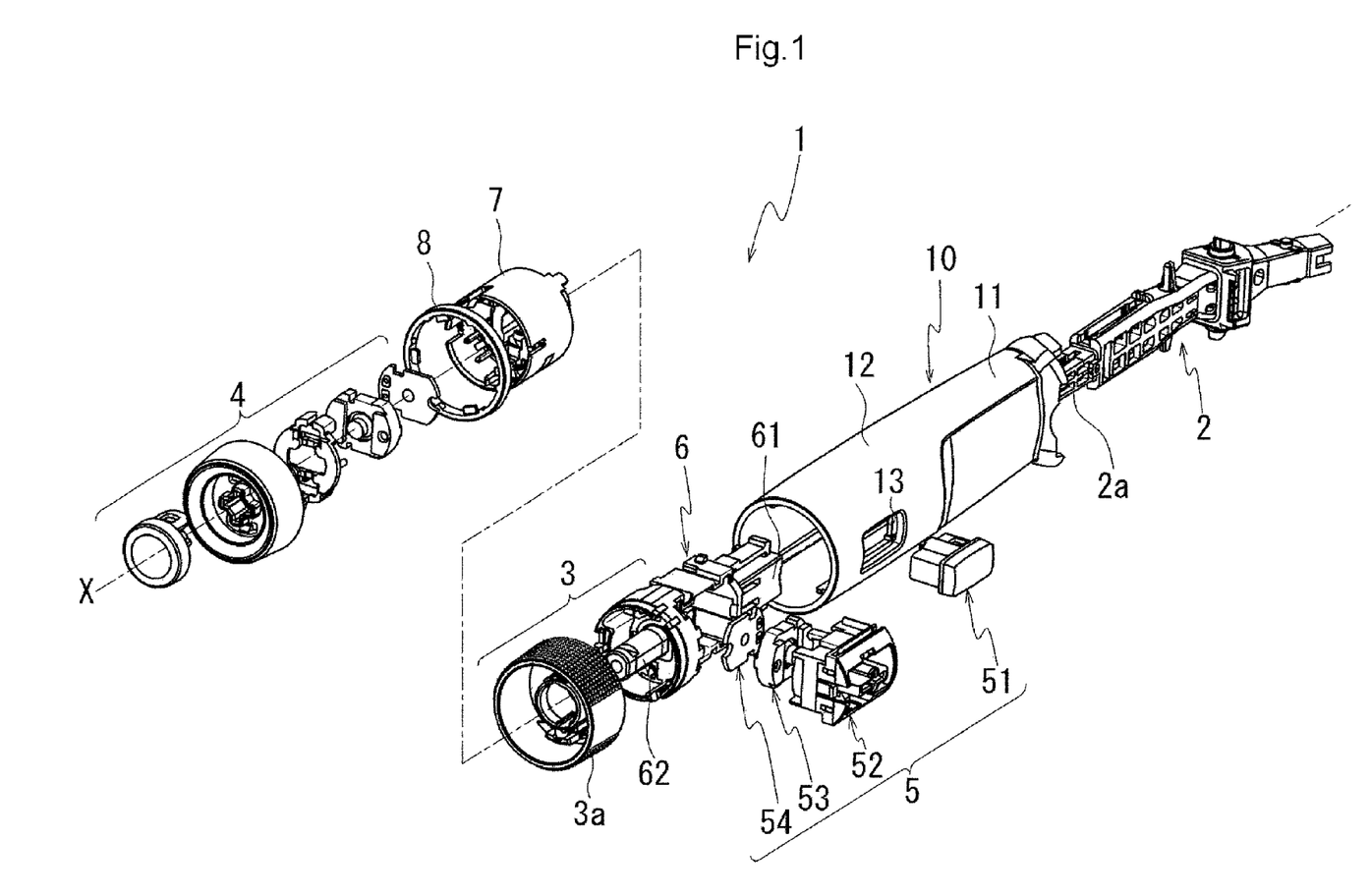
FIG. 1 is an exploded perspective view showing a vehicular lever switch according to an embodiment in the present invention.
Figure 2:
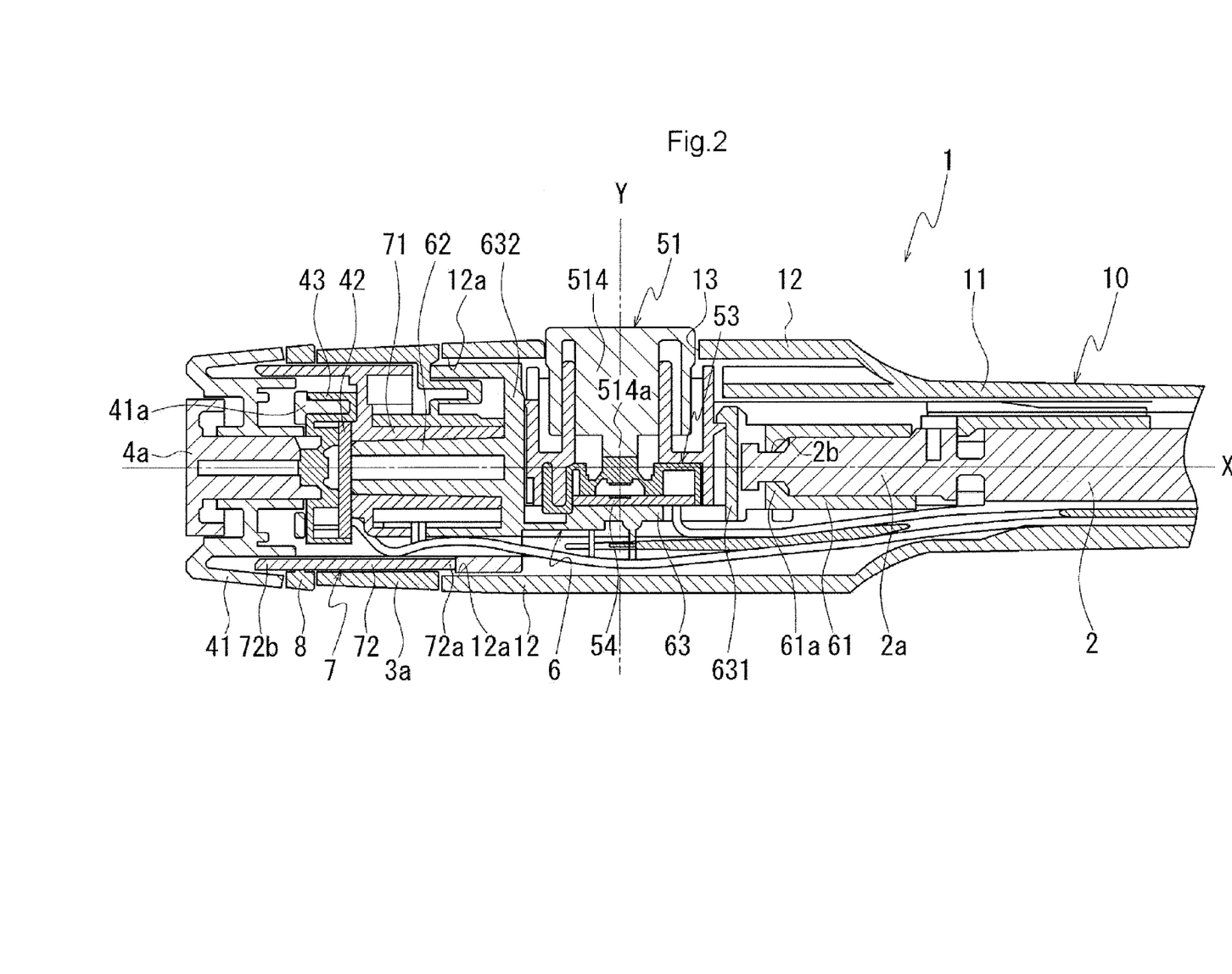
FIG. 2 is a cross section showing the vehicular lever switch according to the embodiment.
Figure 3:
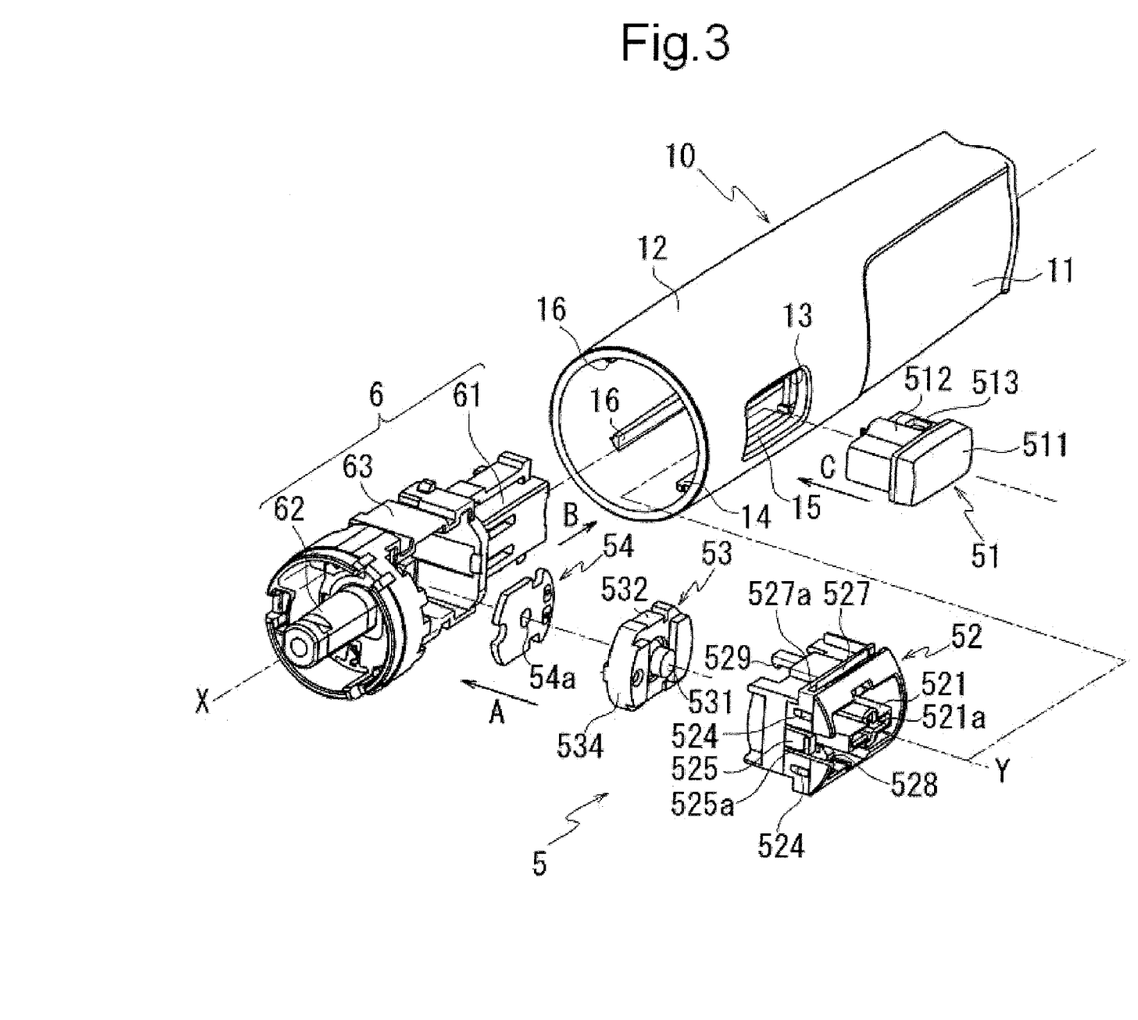
FIG. 3 is a partially enlarged view showing the vehicular lever switch according to the embodiment.

FIG. 1 is an exploded perspective view of a vehicular lever switch 1. FIG. 2 is a cross section of the vehicular lever switch 1 in FIG. 1. FIG. 3 is an enlarged exploded perspective view of part of a switch device 5 in FIG. 1.

As shown in FIG. 1, the vehicular lever switch 1 according to the embodiment is provided with a tubular case 10, and a lever guide 2 is inserted into the case 10 from a side of a base part 11 thereof.

As shown in FIG. 2, a connecting component 2a in a tip end side of the lever guide 2 is axially inserted into a tubular engagement component 61 of a base member 6 (refer to FIG. 1 and FIG. 3), and an engagement click 61a of the engagement component 61 is fitted into a recessed part 2b provided on an outer periphery of the connecting component 2a to connect the lever guide 2 to the base member 6.

A tip end of the case 10 forms part of an operational component 12 of the vehicular lever switch 1, and the operational component 12 is formed in a diameter larger than the base part 11 into which the lever guide 2 is inserted. An opening 13 is formed substantially in the center of the operational component 12 in a longitudinal direction to penetrate through the operational component 12 in a thickness direction (direction (axis Y direction) perpendicular to a longitudinal direction (axis X direction) of the case 10). An operational knob 51 of the switch device 5 to be described later is positioned in the opening 13.

As shown in FIG. 2 and FIG. 3, the base member 6 inserted into the case 10 in an axial direction (axial direction of the axis X) is fitted and mounted inside the operational component 12. A connecting component 62 to a rotary switch 3 (refer to FIG. 1) is provided integrally as a part of the base member 6 at the opposite to the aforementioned engagement component 61 in the base member 6. As shown in FIG. 3, in the base member 6, a section between the connecting component 62 and the engagement component 61 forms part of an accommodating component 63 for accommodating a knob holder 52 in the switch device 5 to be described later, and the base member 6 is formed of the engagement component 61, the connecting component 62, and the accommodating component 63 integral with each other.

As shown in FIG. 2, the connecting component 62 is formed extending from a central part of a partition wall component 632 defining the accommodating component 63. The connecting component 62 is formed in a cylindrical shape to have a length extending from a tip end opening 12a of the operational component 12 to an outside of the operational component 12. An inner tubular component 71 of a connecting member 7 is axially fitted onto an outer periphery of the connecting component 62 to be mounted thereon, and the base member 6 (connecting component 62) and the connecting member 7 are connected not to be movable relatively with each other.

An outer tubular component 72 positioned radially outside of the inner tubular component 71 is formed in an outer diameter smaller than the operational component 12, and one end 72a of the outer tubular component 72 at a side of the operational component 12 is positioned inside the tip end opening 12a of the operational component 12. An operational knob 3a of the rotary switch 3 is inserted onto the outer tubular component 72 at an outside thereof, and the operational knob 3a is mounted to the outer tubular component 72 to be movable relatively thereto.

A cover component 41 of the push switch 4 is mounted to the other end 72b of the outer tubular component 72, and a ring-shaped spacer 8 is interposed between the cover component 41 and the operational knob 3a.

A polar board 42 of the push switch 4 makes axial contact with the inner tubular component 71 of the connecting member 7, and the polar board 42 and a rubber contact 43 fitted and mounted on the outer periphery of the polar board 42 are arranged in a state of being interposed between the inner tubular component 71 and a contact component 41a of the cover component 41. The rubber contact 43 axially makes contact with a knob 4a supported by the cover component 41, and an unillustrated movable contact point provided in the rubber contact 43 and an unillustrated fixed contact point provided in the polar board 42 are structured to be connected/disconnected by an operation of the knob 4a.

Figure 4:
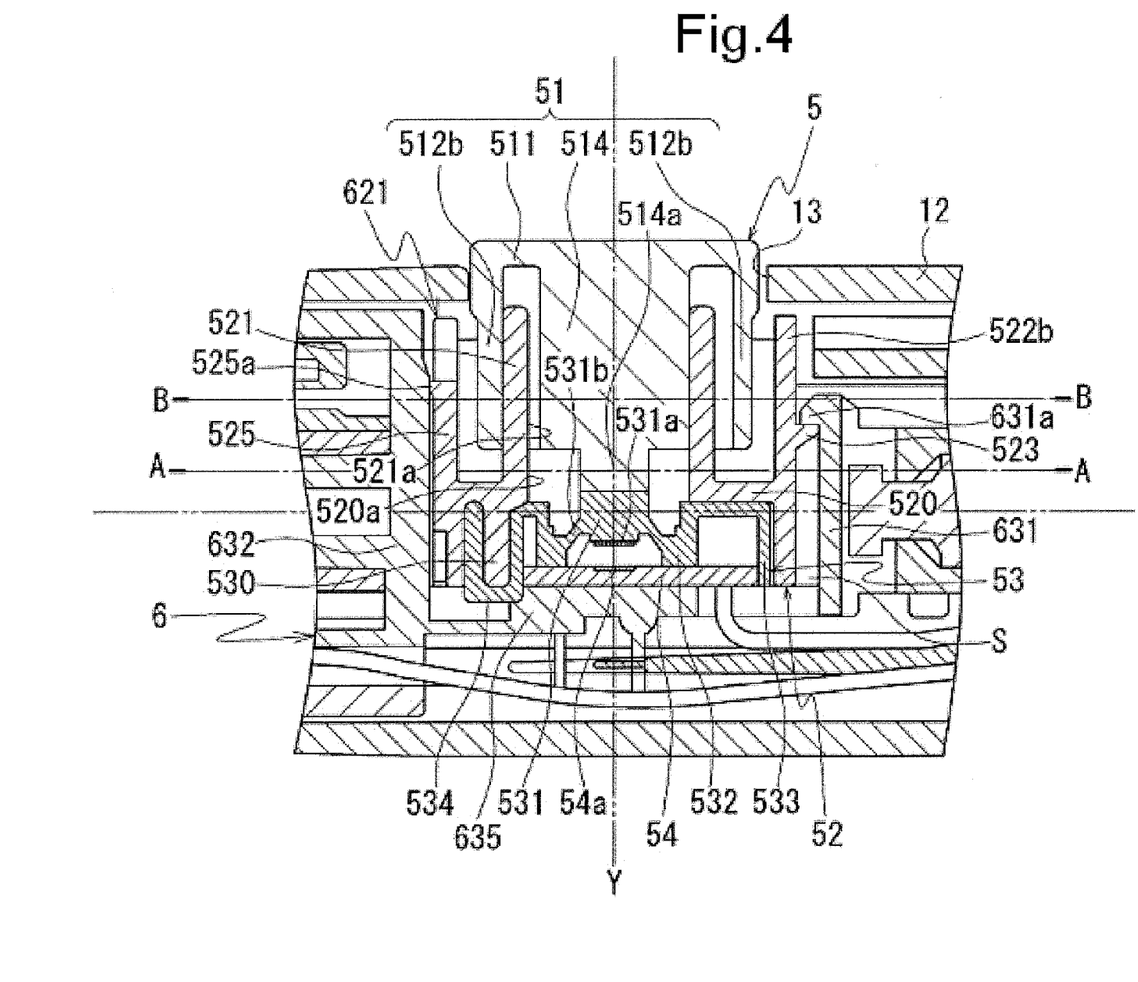
FIG. 4 is a cross section showing the vehicular lever switch according to the embodiment.
Figure 5:
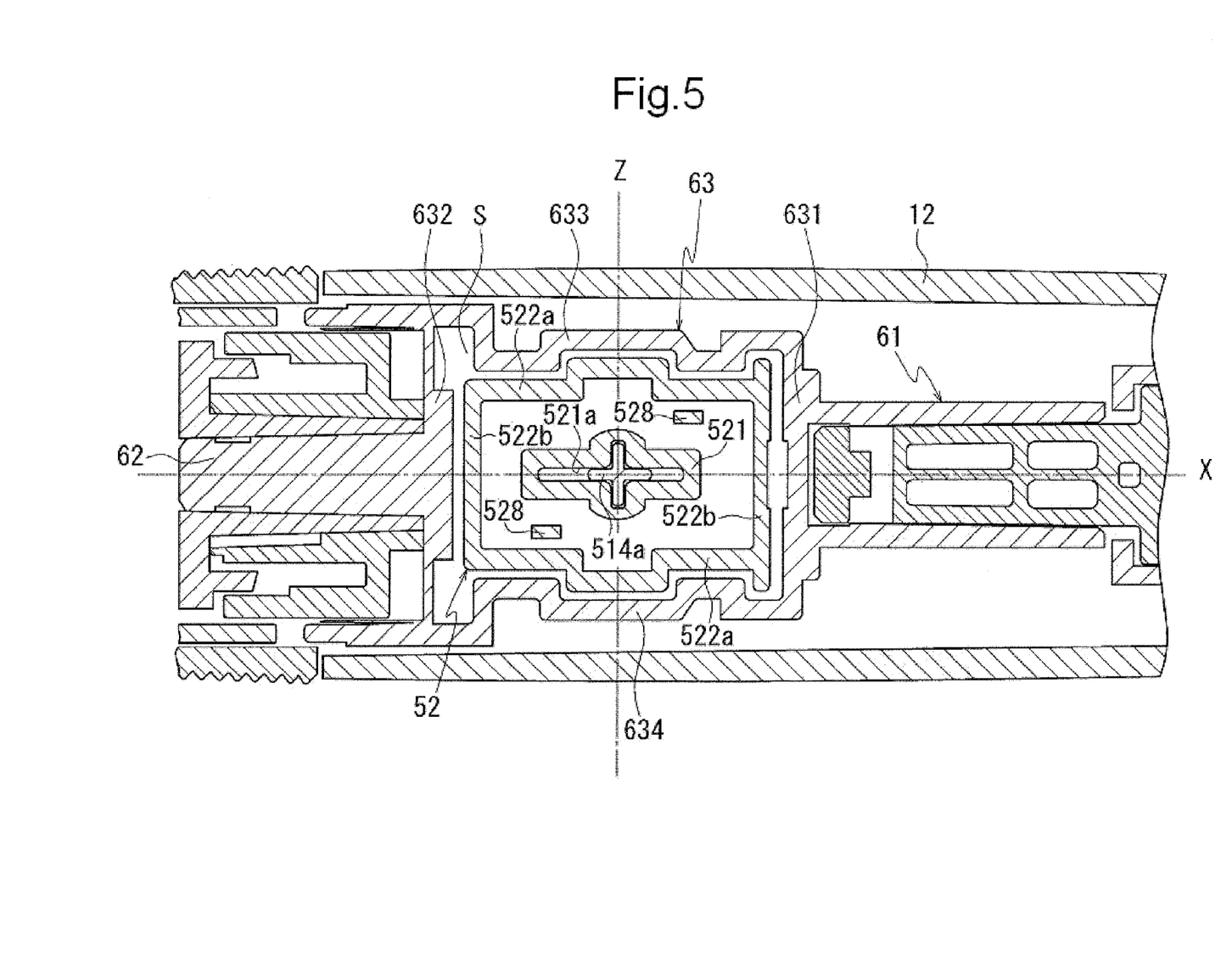
FIG. 5 is a cross section showing the vehicular lever switch according to the embodiment.
Figure 6:
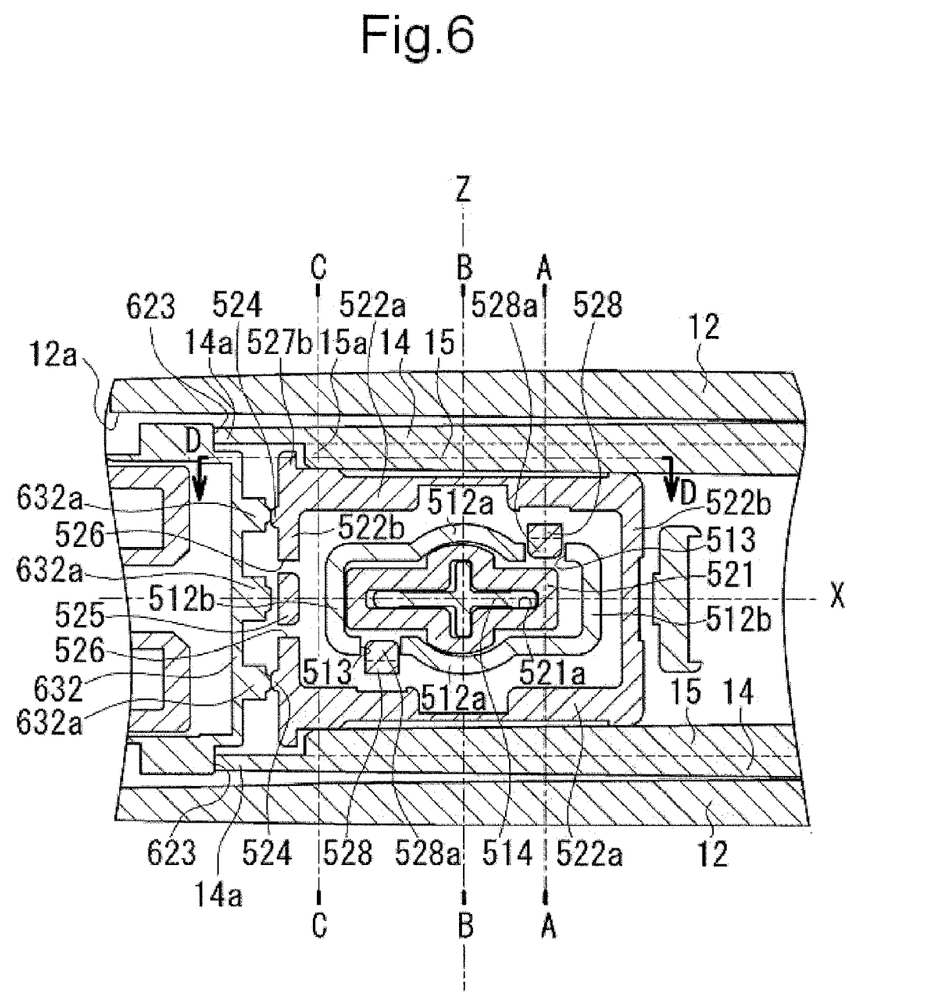
FIG. 6 is a cross section showing the vehicular lever switch according to the embodiment.

Hereinafter, the accommodating component 63 of the base member 6 will be explained. FIG. 4 is a partially enlarged view of the switch device in FIG. 2. FIG. 5 is a cross section taken along line A-A in FIG. 4. FIG. 6 is a cross section taken along B-B in FIG. 4.

As shown in FIG. 5, the accommodating component 63 includes a partition wall component 631 at a side of the engagement component 61, the partition wall component 632 at a side of the connecting component 62, connecting wall components 633 and 634 connecting ends of the partition wall components 631 and 632 with each other, and is provided with a tubular space S surrounded by these components. The tubular space S is formed along the axis Y direction (refer to FIG. 3) perpendicular to the axis X.

As shown in FIG. 3, the accommodating component 63 is opened to a side of the opening 13 of the operational component 12, and the knob holder 52 in the switch device 5 is structured to be accommodated in the space S from a side of the opening 13. The accommodating component 63 is provided with a bottom component 635 at the opposite to the opening 13 for preventing the knob holder 52 accommodated in the tubular space S from dropping down (refer to FIG. 4). The space S is formed as a tubular space with a bottom by the bottom component 635.

As shown in FIG. 5, the partition wall components 631 and 632 and the connecting wall components 633 and 634 of the accommodating component 63 are formed to surround peripheral wall component 522 (522a and 522b) of knob holder 52 by predetermined intervals. In the embodiment, in a state where the knob holder 52 is not fixed to a side of the operational component 12 (the case 10), the knob holder 52 (peripheral wall component 522) is structured to be capable of being displaced in the axis X direction and the axis Z direction in the space S.

As shown in FIG. 4, the partition wall component 631 is provided with a projection component 631a projecting into the space S, and an engagement projection 523 is provided also in the peripheral wall component 522b of the knob holder 52 opposing the partition wall component 631 to project toward the partition wall component 631. As a result, when the knob holder 52 moves in a direction (upper direction in the figure) of the dropping-down from the space S (accommodating component 63) in an axial direction of the axis Y, the projection component 631a and the engagement projection 523 make contact with each other to prevent the dropping-down of the knob holder 52 from the space S.

As shown in FIG. 3, the switch device 5 is structured by including the operational knob 51, the knob holder 52, the rubber contact 53, and a polar board 54. As shown in FIG. 4, a fixed contact point 54a is provided on an upper surface of the polar board 54 at a side of the operational component 51, and a movable contact point 531a supported by a movable component 531 of the rubber contact 53 is arranged in a position spaced from the fixed contact point 54a at a side of the operational knob 51 along the axis Y.

The rubber contact 53 includes the movable component 531, a placement component 532 placed on the polar board 54, a fitting wall component 533 fitted on an outer periphery of the polar board 54, and an engagement component 534 engaging to the engagement component 530 of the knob holder 52. The rubber contact 53 is integrally formed of a resilient material such as rubber, and the movable component 531 connected through a connecting component 531b to the placement part 532 is movable forward and backward in a perpendicular direction (axis Y direction) of the polar board 54 due to resilient deformation of the connecting component 531b. Therefore the movable contact point 531a is capable of being connected to/disconnected from the fixed contact point 54a, and in the embodiment, the movable contact point 531a, the fixed contact point 54a, the rubber contact 53, and the polar board 54 form part of the push switch.

The polar board 54 is mounted to the bottom component 520 of the knob holder 52 in a state where the rubber contact 53 is assembled to the polar board 54, and the dropping-down of the rubber contact 53 and the polar board 54 from the knob holder 52 is prevented by engagement clicks 529 (refer to FIG. 8) provided in the knob holder 52.

In the embodiment, the switch device 5 in the operational component 12 is completed according to the following procedure. As shown in FIG. 3, (1) after the rubber contact 53 and the polar board 54 are mounted to the knob holder 52, the knob holder 52 is accommodated in the accommodating component 63 of the base member 6 (refer to an arrow A in the figure). (2) The base member 6 is axially assembled to the operational component 12, and the knob holder 52 is positioned in the opening 13 of the operational component 12 (refer to an arrow B in the figure). (3) The operational knob 51 is inserted into the opening 13 to be engaged to a guide component 521 of the knob holder 52 (refer to an arrow C in the figure).

Figure 7:
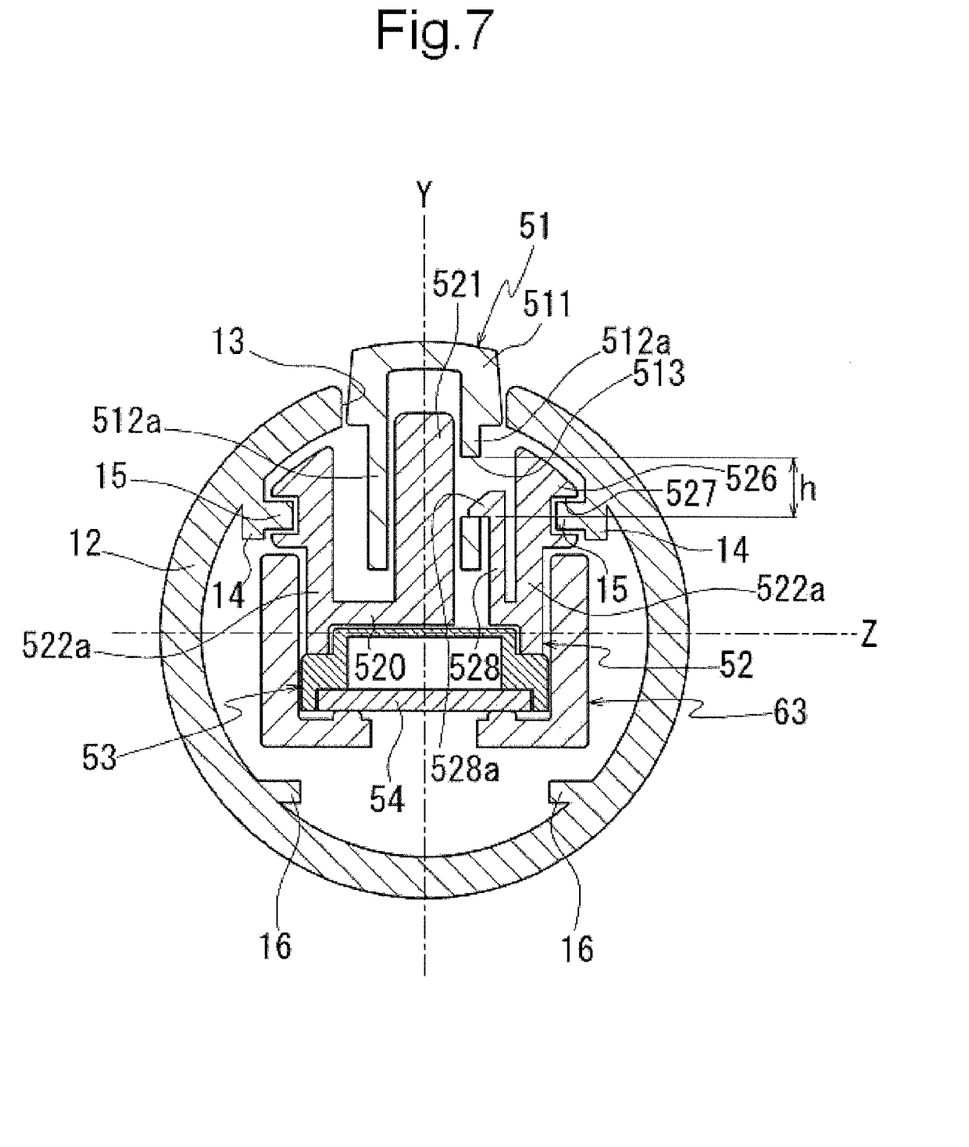
FIG. 7 is a cross section showing the vehicular lever switch according to the embodiment.
Figure 8:
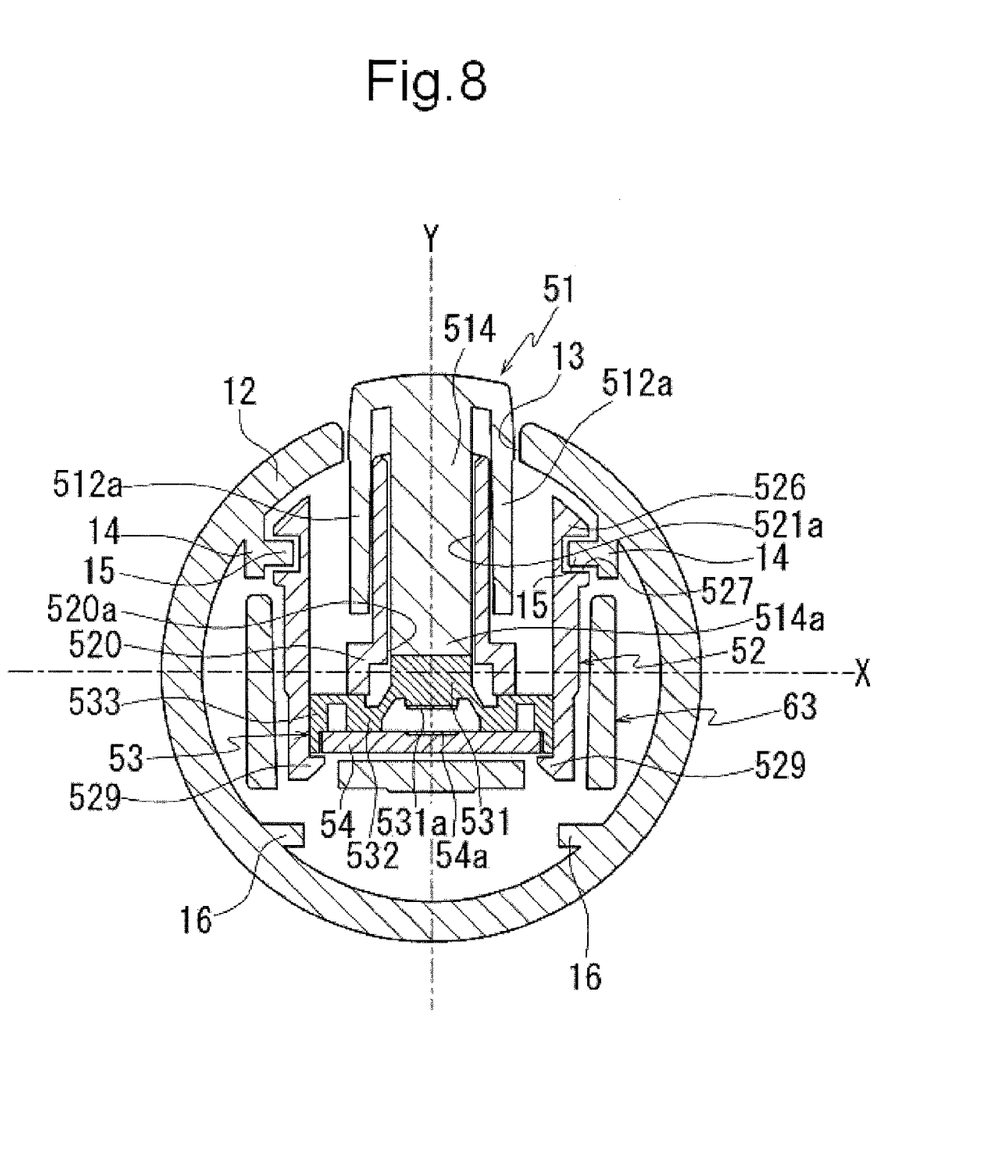
FIG. 8 is a cross section showing the vehicular lever switch according to the embodiment.
Figure 9:
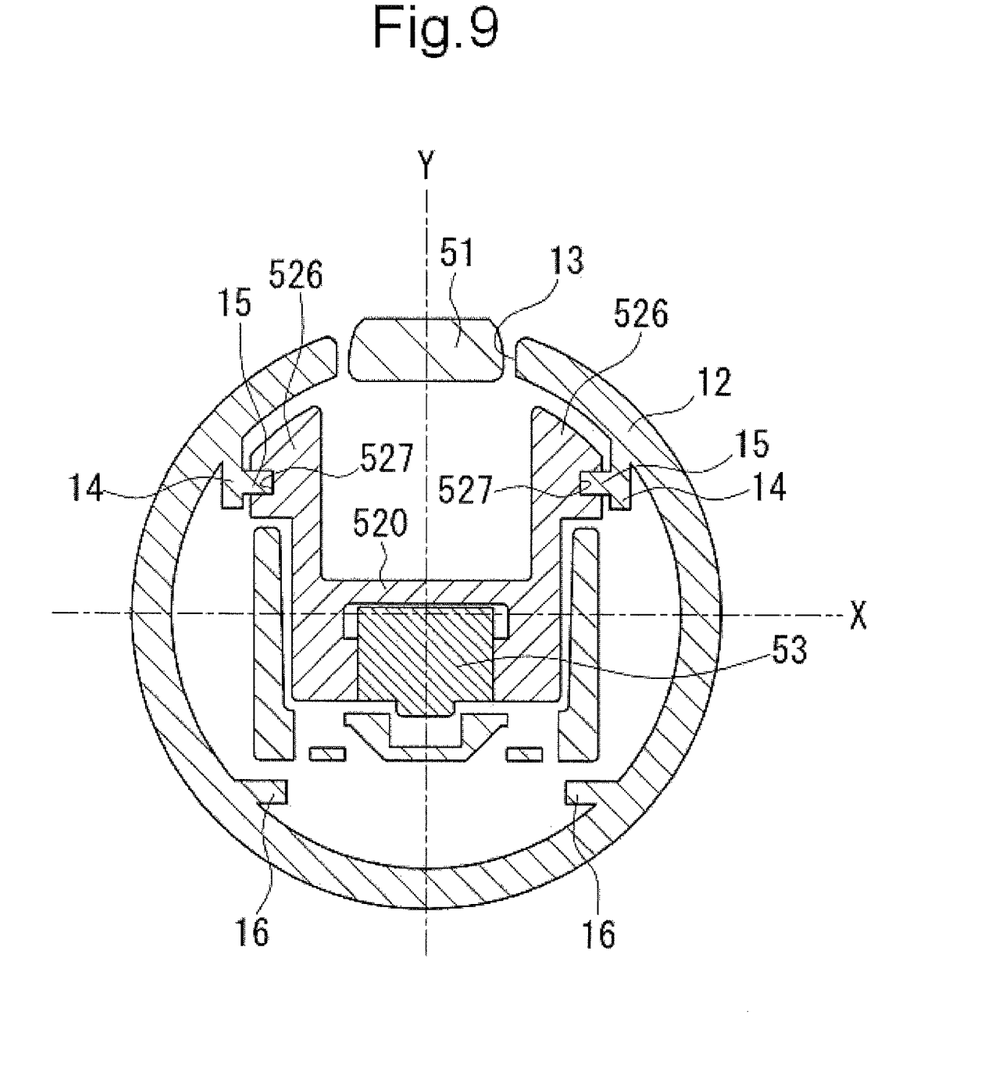
FIG. 9 is a cross section showing the vehicular lever switch according to the embodiment.
Figure 10:
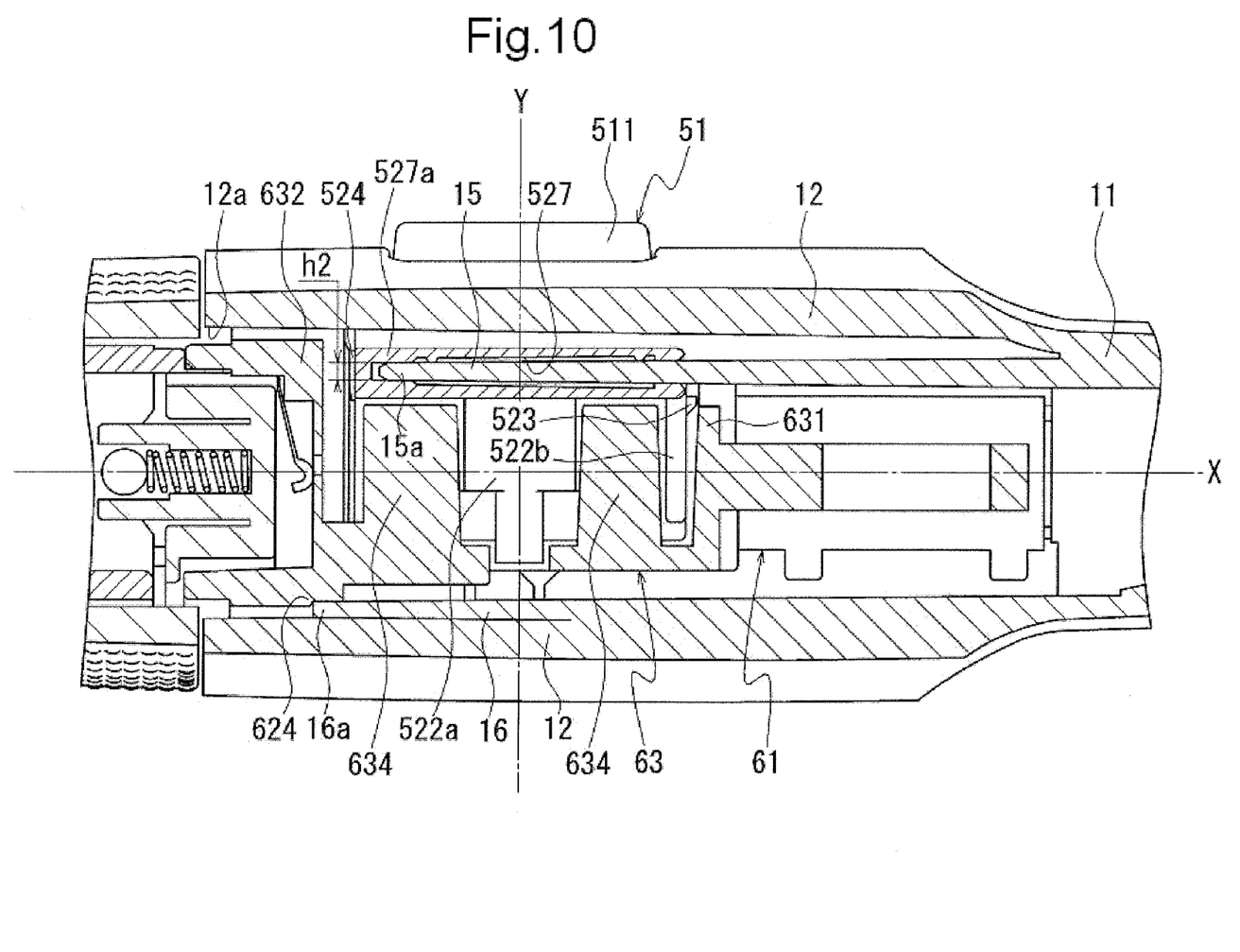
FIG. 10 is a cross section showing the vehicular lever switch according to the embodiment.

Hereinafter, the operational knob 51 and the knob holder 52 in the switch device 5 will be explained. FIG. 7 is a cross section taken along line A-A in FIG. 6. FIG. 8 is a cross section taken along B-B in FIG. 6. FIG. 9 is a cross section taken along line C-C in FIG. 6. FIG. 10 is a cross section taken in a direction of arrows D-D in FIG. 6.

As shown in FIG. 3, the operational knob 51 is provided with a rectangular pressing component 511 in a planar view. The pressing component 511 is provided with a tubular peripheral wall component 512, and the peripheral wall component 512 is inserted into the opening 13 to be engaged to the knob holder 52 in the operational component 12.

As shown in FIG. 6, each of peripheral wall components 512a in the longitudinal side in the peripheral wall component 512 have a central part in the longitudinal direction which is swollen outside. An opening 513 is formed in the vicinity of each of peripheral wall components 512b in the peripheral wall components 512, and an engagement click 528a of each of engagement pole components 528 to be described later is engaged to the opening 513.

As shown in FIG. 7, the opening 513 is formed in a substantially central part of the peripheral wall component 512a in the height direction to penetrate through the peripheral wall component 512a in the thickness direction. The opening 513 is formed in a length h longer than a stroke amount (movement amount) of the operational knob 51 for enabling the operational knob 51 to move forward and backward in the axis Y direction, and the engagement click 528a of the engagement pole component 528 prevents the operational knob 51 from dropping down from the knob holder 52.

As shown in FIG. 6, an insert component 514 of the operational knob 51 is positioned inside the peripheral wall component 512 (512a and 512b). As shown in FIG. 4, the insert component 514 is formed extending in a direction away from the pressing component 511. The insert component 514 is designed to be inserted into an insert hole 521a of the guide component 521 at the time the operational knob 51 is assembled to the knob holder 52, and a cross sectional configuration thereof is formed as a cross shape fitting together to the insert hole 521a.

As shown in FIG. 4, a contact component 514a as a tip end of the insert component 514 extends downward to be closer to the polar board 54 than the peripheral wall component 512b, and makes contact with the movable component 531 of the rubber contact 53 in a through hole 520a provided in the bottom component 520 of the knob holder 52. Accordingly the operational knob 51 is placed on the movable component 531 of the rubber contact 53 to be held thereon in a state of being assembled to the knob holder 52.

As shown in FIG. 4, the rubber contact 53 is provided with the movable component 531 in which the movable contact point 531a is provided on the lower surface at a side of the polar board 54, the placement part 532 placed on the polar board 54, and the fitting wall component 533 surrounding the polar board 54, and the movable component 531 is provided in a position fitting together to the fixed contact point 54a provided on the upper surface of the polar board 54 at a side of the movable component 531. In the embodiment, the operational knob 51 is provided in the guide component 521 of the knob holder 52 to be movable forward and backward in the axis Y direction. When the operational knob 51 is pressed toward the polar board 54, the movable component 531 pressed by the contact component 514a moves to a position where the movable contact point 531a makes contact with the fixed contact point 54a of the polar board 54, thus switching on the switch device 5.

When the urging force exerting on the operational knob 51 disappears, the movable component 531 moves the operational knob 51 in a direction away from the polar board 54 by a recovery force of the rubber contact 53 made of a resilient material to return the movable contact point 531a to an initial position spaced from the fixed contact point 54a of the polar board 54.

As shown in FIG. 5, in the knob holder 52, the guide component 521 engaging to the insert component 514 of the operational knob 51 is provided in the center of the bottom component 520 (refer to FIG. 4), and the peripheral wall component 522 (522a and 522b) surrounding the guide component 521 is provided on an outer peripheral edge of the bottom component 520. The guide component 521 is formed in a cross shape in a planar view, and has the cross-shaped insert hole 521a in the central part. As shown in FIG. 4, the insert hole 521a is communicated with the through hole 520a provided in the bottom component 520 of the knob holder 52, and at the time of assembling the operational knob 51 to the knob holder 52, the contact component 514a of the insert component 514 inserted into the insert hole 521a penetrates through the through hole 520a to make contact with the movable component 531 of the rubber contact 53.

As shown in FIG. 6, the peripheral wall component 522 (522a and 522b) of the knob holder 52 is provided to surround the peripheral wall component 512 (512a and 512b) of the operational knob 51 assembled to the knob holder 52 by intervals. The engagement pole component 528 extending upward toward the operational knob 51 from the bottom part 520 is provided between the peripheral wall component 512a and the peripheral wall component 522a. The engagement click 528a engaging to the opening 513 of the peripheral wall component 512 in the operational knob 51 is provided in the tip end of the engagement pole component 528 (refer to FIG. 7).

As shown in FIG. 6 and FIG. 3, the peripheral wall component 522b positioned at a side of the partition wall component 632 is provided with projections 524 projecting toward the partition wall component 632, which are positioned close to both sides of the peripheral wall component 522b in the longitudinal direction, and a resilient engagement component 525 is provided between these projections 524. Notches 526 are provided at both the sides of the resilient engagement component 525, and the resilient engagement component 525 is resiliently deformable in an axial direction of the axis X (direction perpendicular to the longitudinal direction of the peripheral wall component 522b).

As shown in FIG. 4 and FIG. 3, a projection component 525a projecting toward the partition wall component 632 is provided in the tip end of the resilient engagement component 525. The projection component 525a is provided to project closer to the partition wall component 632 than the projections 524 (refer to FIG. 6) positioned at both sides of the resilient engagement component 525.

As shown in FIG. 6, the partition wall component 632 is provided with swollen components 632a swollen toward the knob holder 52 (peripheral wall component 522b) in positions corresponding to the projections 524 and the resilient engagement component 525.

In the embodiment, at the time of accommodating the knob holder 52 in the accommodating component 63, the projections 524 and the resilient engagement component 525 slide to the swollen components 632a to accommodate the knob holder 52 in the accommodating component 63. Further, in a state where the knob holder 52 is fixed to a side of the operational component 12 (case 10), the projection component 525a makes contact with the partition wall component 632 (swollen component 632a), and the knob holder 52 is held in a state where the resilient engagement component 525 is resiliently deformed.

As shown in FIG. 7 to FIG. 9, the knob holder 52 is provided with connecting components 526 to a side of the case 10 at both the sides in a direction perpendicular to the axis Y in the figure (axis Z direction: width direction of the knob holder 52). The connecting component 526 is formed to be swollen in the width direction (axis Z direction) of the knob holder 52 from the upper end of the peripheral wall component 522a at a side of the operational knob 51.

The connecting components 526 are provided with fitting grooves 527 opened in the axis Z direction, and the knob holder 52 is fixed to a side of the case 10 by fitting guide ribs 15 of positioning ribs 14 to be described later into the fitting grooves 527.

As shown in FIG. 3 and FIG. 10, the fitting groove 527 is formed across an entire length of the knob holder 52 along the axial direction of the axis X, and an end part of the fitting groove 527 at a side of the partition wall component 632 forms part of a fitting part 527a into which a tip end part 15a of the guide rib 15 is fitted. The fitting groove 527 is formed such that a width h2 in a direction perpendicular to the axis X is wider as being away from the fitting part 527a, and the guide rib 15 is inserted into the fitting groove 527 from a side of the partition wall component 631 to be press-fitted therein.

As shown in FIG. 7, the positioning ribs 14 each having the guide rib 15 and positioning ribs 16 are provided inside the operational component 12. The positioning ribs 14 are provided in the vicinity of the opening 13 in a state where the guide ribs 15 are opposed to each other in an axial direction of the axis Z.

As shown in FIG. 6 and FIG. 10, the positioning ribs 14 extend along an axial direction of the axis X from the base part 11 of the case 10 toward the tip end opening 12a radially inside of the operational component 12. In the operational component 12, the positioning ribs 14 and the guide ribs 15 respectively are provided in parallel to each other by a predetermined interval.

A tip end part 14a of the positioning rib 14 makes contact with a contact component 623 of the partition wall component 631 inside the operational component 12, and the positioning (positioning in the axis X direction) of the base member 6 in the operational component 12 is performed by the positioning rib 14 and the contact component 623.

As shown in FIG. 6, the guide rib 15 is formed to extend from the positioning rib 14 in a direction (axis Z direction) perpendicular to the axis X. In a state where the positioning of the base member 6 in the axis X direction in the operational component 12 is performed by the positioning rib 14 and the contact component 623, the guide rib 15 is fitted into the fitting groove 527 of the knob holder 52, and the positioning of the knob holder 52 in the axis Z direction is performed by the guide rib 15.

It should be noted that in the embodiment, for preventing the positioning of the base member 6 in the axis X direction from being blocked by the guide rib 15, the guide rib 15 is designed to have an axial length of the axis X to the extent that the tip end part 15a does not make contact with a wall part 527b of the fitting part 527a.

As shown in FIG. 7, the positioning rib 16 extends in the same direction with the extending direction of the guide rib 15 from the inner peripheral surface of the operational component 12, and, as shown in FIG. 10, extends toward the tip end opening 12a of the operational component 12 in the axial direction of the axis Z radially inside of the operational component 12. In addition, a tip end part 16a of the positioning rib 16 makes contact with the contact component 624 of the partition wall component 632 inside the operational component 12.

Hereinafter, assembling of the switch device 5 to the operational component 12 will be explained. First, (1) the rubber contact 53 and the polar board 54 are assembled to the knob holder 52 to form the assembled knob holder 52. (2) The assembled knob holder 52 is accommodated in the accommodating component 63 of the base member 6 (refer to the arrow A in FIG. 3). In this state, the assembled knob holder 52 is movable in the axis X direction and the axis Z direction inside the accommodating component 63 (space S) of the base member 6 (refer to FIG. 5), and is temporarily assembled in the base member 6.

(3) The base member 6, in which the knob holder 52 is temporarily assembled in the accommodating component 63, is inserted into the operational component 12 (refer to the arrow B in FIG. 3), and the knob holder 52 is positioned in the opening 13 of the operational component 12. (4) The operational knob 51 is inserted into the opening 13 to be engaged to the knob holder 52 (refer to the arrow C in the figure).

Here, at the time the base member 6 is inserted into the operational component 12, the base member 6 is inserted in the operational component 12 to a position where the positioning ribs 14 and 16 at a side of the operational component 12 make contact with the contact components 623 and 624 of the partition wall component 631, and the base member 6 is held (positioned) in a state where the movement of the base member 6 in the axis X direction is restricted (refer to FIG. 6 and FIG. 10).

Further, at the time the base member 6 is inserted into the operational component 12, the guide rib 15 of the positioning rib 14 is inserted into the fitting groove 527 of the knob holder 52, and the tip end part 15a of the guide rib 15 is finally fitted into the fitting part 527a of the fitting groove 527. Therefore the knob holder 52 is held (positioned) in a state where the movement thereof in the axis Z direction is restricted by the guide rib 15 at a side of the operational component 12 (case 10).

In the process of inserting the base member 6 into the operational component 12, since the tip end part 15a of the guide rib 15 is lightly press-fitted into the fitting part 527a of the fitting groove 527, the knob holder 52 is pushed toward the partition wall component 632 by the guide rib 15, and moves to a position where the projecting component 525a of the resilient engagement component 525 makes contact with the partition wall component 632.

Then, the knob holder 52 is held to be interposed between the partition wall component 632 and the guide rib 15 in a state where the resilient engagement component 525 is resiliently deformed. Therefore the knob holder 52 is held (positioned) in a state where the movement in the axis X direction is restricted, subjected to an urging force by the resilient engagement component 525.

In this way, when the base member 6 is inserted into the operational component 12 to be positioned therein, the knob holder 52 in the accommodating component 63 of the base member 6 is fixed directly to a side of the operational component 12 (case 10) through the guide rib 15. Therefore as compared to a conventional case where the holder is fixed to a side of the base member, since the influence of the dimensional tolerance is not so much exerted, the knob holder 52 can be arranged in the opening 13 of the operational component 12 with excellent accuracy, and the operational knob 51 can be more certainly assembled in the knob holder 52 to complete the switch device 5.

As described above, in the embodiment, the tubular case 10 forming part of the operational lever in the vehicular lever switch 1 is provided with the switch device 5 operated in a direction (axis Y direction) perpendicular to an axial direction of the operational lever. In the vehicular lever switch 1 provided with the switch device 5 comprising the operational knob 51 provided to be inserted into the opening 13 formed in the operational component 12 in the case 10, the push switch operated by the operational knob 51, and the knob holder 52 provided in the case 10 to support the operational knob 15 to be movable forward and backward in the operational direction (axis Y direction) of the push switch, the knob holder 52 is directly fixed and supported to a side of the case 10.

According to the above structure, since the knob holder 52 is directly fixed and supported to the tubular case 10, the positional deviation between the opening 13 and the knob holder 52 can be made smaller as compared to a case where the knob holder 52 is indirectly supported to the tubular case. Further, the rattling of the knob holder 52 can be suppressed. Thereby it is not necessary to make a size of the opening 13 at a side of the case 10 wider in advance assuming the dimensional tolerance or the like, and a clearance between the operational knob 51 and the opening 13 can be made narrower. Therefore intrusion of dusts and liquids into the case 10 can be more appropriately prevented.

The push switch is provided with the movable contact point 531a, the polar board 54 including the fixed contact point 54a, and the rubber contact 53 for holding the movable contact point 531a in a position spaced from the fixed contact point 54a to be capable of being connected/disconnected to the fixed contact point 54a, wherein the respective components of the push switch are assembled integrally with the knob holder 52.

According to this structure, the rubber contact 53 including the movable contact point 531a and the polar board 54 including the fixed contact point 54a are assembled to the knob holder 108 to form a sub-assembly. Therefore assembling the components of the switch device 5 excepting the operational knob 51 to the case 10 can be more simply performed.

The vehicular lever switch 1 further includes the base member 6 inserted in the tubular case 10 in the axial direction of the axis X to be fitted in and fixed to the case 10, wherein the base member 6 includes the accommodating component 63, the accommodating component 63 is formed to be opened to a side of the opening 13 to accommodate the knob holder 52, and has the peripheral wall component (the partition wall components 631 and 632, and the connecting wall components 633 and 634) surrounding the outer periphery of the knob holder 52, and the case 10 is structured to include the guide rib 15 which is, at the time of inserting the base member 6 into the case 10, fitted into the knob holder 52 accommodated in the accommodating component 63 in the axial direction of the axis X in the case 10 to fix and support the knob holder 52 with the case 10.

With this structure, simply by assembling the base member 6 to a side of the case 10 after temporarily assembling the knob holder 108, in which the rubber contact 53 including the movable contact point 531a and the polar board 54 including the fixed contact point 54a are assembled, to the base member 6, the knob holder 52 can be fixed and supported with the case 10. Thereby assembling the components except the operational knob 51 in the switch device 5 to a side of the case 10 can be more simply performed.

Particularly the base member 6 includes the peripheral wall (partition wall components 631 and 632, and the connecting wall components 633 and 634) surrounding the peripheral wall component 522 (522a and 522b) of the knob holder 52 by predetermined intervals, and the knob holder 52 is temporarily assembled to the base member 6 in a state of being capable of moving in the axis X direction and the axis Z direction in the space S surrounded by the peripheral wall.

According to this structure, since the knob holder 52 can be moved in the space S, even if the dimensional tolerance occurs at a side of the base member 6, it is possible to arrange the knob holder 52 to a position corresponding to the opening 13 at a side of the case 10. Thereby since the operating knob 51 have been inserted into the opening 13 can be certainly assembled to the knob holder 52, this structure can contribute to an improvement on a yield loss in the manufacture of the vehicular lever switch 1.

The knob holder 52 is structure such that the fitting grooves 527 fitting with the guide ribs 15 are formed along the insert direction at both sides of the knob holder 52 in the width direction (axis Z direction) perpendicular to the insert direction (axis X direction) of the base member 6.

According to this structure, the positional deviation of the knob holder 52 in the axis Z direction can be prevented by the guide rib 15, and the positional accuracy of the knob holder 52 can be improved. Accordingly the positional deviation between the opening 13 and the knob holder 52 can be made small, while suppressing the rattling of the knob holder 52.

The knob holder 52 includes the resilient engagement component 525 projecting to a side of the partition wall component 632 positioned at the opposite to the insert direction of the base member 6, and the resilient engagement component 525 makes contact with the partition wall component 632 defining the accommodating component 63 in a state where the knob holder 52 is fixed and supported through the guide rib 15 to a side of the case 10.

According to this structure, since the knob holder 52 is held to be interposed between the partition wall component 632 and the guide rib 15 in a state of resiliently deforming the resilient engagement component 525, the knob holder 52 is held (positioned) in a state where the movement in the axis X direction is restricted by receiving the urging force of the resilient engagement component 525. Accordingly, as compared to the conventional case where the holder is fixed to a side of the base member, since the influence of the dimensional tolerance is not so much exerted, the knob holder 52 can be arranged in the opening 13 of the operational component 12 with excellent accuracy, and the operational knob 51 can be more certainly assembled in the knob holder 52 to complete the switch device 5.

In addition, there is provided an assembling method of the vehicular lever switch comprising, a step for assembling the rubber contact 53 including the movable contact point 531a and the polar board 54 including the fixed contact point 54a to the knob holder 108 to sub-assemble the knob holder 52, and temporarily accommodating the sub-assembled knob holder 52 in the accommodating component 63 of the base member 6, a step for fitting the guide rib 15 into the fitting groove 527 of the knob holder 52, inserting the base member 6 into the case 10 in the axial direction (in the axis X direction) to be fitted in and fixed to the case 10, and directly fixing and supporting the knob holder 52 to a side of the case 10 by the guide rib 15 in a state of being positioned in the opening 13, and a step for inserting the operational knob 51 into the opening 13 to be assembled to the knob holder 52.

According to this structure, simply by temporarily assembling (temporarily accommodating) the sub-assembled knob holder 108 to the base member 6 which is axially assembled to the case 10, since it is possible to arrange the knob holder 108 in the opening 13 with positional accuracy, the easy-assembling vehicular lever switch can be realized.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A vehicular lever switch including an operational lever, a tubular case forming part of the operational lever, and a switch device provided in the tubular case to be operable in a direction perpendicular to an axial direction of the operational lever, the switch device comprising:
   an operational knob provided to be inserted through an opening formed in the tubular case;
   a push switch operated by the operational knob; and
   a knob holder accommodated in the tubular case to support the operational knob to be movable forward and backward in an operational direction of the push switch, wherein
   the knob holder is directly fixed and supported to the tubular case.

2. A vehicular lever switch according to claim 1, wherein the push switch comprises:
   a movable contact point;
   a base board including a fixed contact point; and
   a resilient member for holding the movable contact point in a position spaced from the fixed contact point to be capable of being connected/disconnected to the fixed contact point, wherein
   the respective components of the push switch are assembled integrally with the knob holder.

3. A vehicular lever switch including an operational lever, a tubular case forming part of the operational lever, and a switch device provided in the tubular case to be operable in a direction perpendicular to an axial direction of the operational lever, the switch device comprising:
   an operational knob provided to be inserted through an opening formed in the tubular case;
   a push switch operated by the operational knob;
   a knob holder provided in the tubular case to support the operational knob to be movable forward and backward in an operational direction of the push switch, the knob holder being directly fixed and supported to the tubular case; and
   a fitting member inserted in the tubular case in the axial direction to be fitted in and fixed to the tubular case, wherein
   the fitting member includes an accommodating component for accommodating the knob holder, wherein
   the accommodating component is formed to be opened to a side of the opening, and includes a peripheral wall component surrounding an outer periphery of the knob holder, and
   the tubular case includes a rib which, at the time of inserting the fitting member into the tubular case, is fitted into the knob holder accommodated in the accommodating component in the tubular case in the axial direction to fix and support the knob holder 52 with the tubular case.

4. A vehicular lever switch according to claim 3, wherein
   the knob holder includes fitting grooves fitting with the guide ribs at both sides of the knob holder in a width direction perpendicular to the insert direction of the fitting member, and
   the fitting groove is formed along the insert direction.

5. A vehicular lever switch according to claim 4, wherein
   the knob holder is provided with a resilient engagement component projecting in a direction at the opposite to the insert direction, wherein
   the resilient engagement component makes contact with the partition wall component in a state where the knob holder is fixed and supported to the tubular case.

6. A method for assembling a vehicular lever switch including an operational lever, a tubular case forming part of the operational lever, and a switch device provided in the tubular case to be operable in a direction perpendicular to an axial direction of the operational lever, the switch device comprising:
   an operational knob provided to be inserted through an opening formed in the tubular case;
   a push switch operated by the operational knob; and
   a knob holder provided in the tubular case to support the operational knob to be movable forward and backward in an operational direction of the push switch, the method comprising:
   a step for accommodating the knob holder in the accommodating component;
   a step for inserting the fitting member into the tubular case in the axial direction to fit the rib into the knob holder and to fit the fitting member into the tubular case for the fixing, and directly fixing and supporting the knob holder to the tubular case by the rib in a state of positioning the knob holder in the opening; and
   a step for inserting the operational knob into the opening to be assembled to the knob holder.

* * * * *